July 27, 1954 R. FÄSSER ET AL 2,684,998

PREPAYMENT APPARATUS FOR TELEPHONE CALLS

Filed Jan. 11, 1952 3 Sheets-Sheet 1

Inventors
Rolf Frässer
Mario Meloni
By Robert E. Burns
Attorney

July 27, 1954 R. FÄSSER ET AL 2,684,998

PREPAYMENT APPARATUS FOR TELEPHONE CALLS

Filed Jan. 11, 1952 3 Sheets-Sheet 2

Inventors
Rolf Frässer
Mario Meloni
By Robert E. Burns
Attorney

July 27, 1954 R. FÄSSER ET AL 2,684,998

PREPAYMENT APPARATUS FOR TELEPHONE CALLS

Filed Jan. 11, 1952 3 Sheets-Sheet 3

Patented July 27, 1954 2,684,998

UNITED STATES PATENT OFFICE 2,684,998

PREPAYMENT APPARATUS FOR TELEPHONE CALLS

Rolf Fässer, Neuhausen, and Mario Meloni, Geneva, Switzerland, assignors to Sodeco Societe des Compteurs de Geneve, Geneva, Switzerland, a firm of Switzerland Application January 11, 1952, Serial No. 266,068

Claims priority, application Switzerland January 15, 1951

13 Claims. (Cl. 179—6.5)

Prepayment apparatuses for telephone calls are already known, wherein it is necessary to insert a slug or coin, the value of which corresponds to the charge for a three-minute call, before dialling. After three minutes, there appears a signal in the listener and it is necessary to insert coins to an amount corresponding to the charge owing for the next three minutes, failing which the connection is cut off. Such prepayment apparatuses have been developed more particularly for automatic telephone systems, wherein the charges are defined in units corresponding to a three-minute conversation. To this end, the conversation is divided into intervals of three minutes each and, at the beginning of each interval, a conversation-meter, associated with the calling station, at the exchange, produces a series of impulses, the number of impulses corresponding to the tariff area with which the connection has been established.

This manner of reckoning the charges is obviously somewhat rough, inasmuch as a conversation lasting say 3.1 minutes costs double the price of a conversation lasting 2.9 minutes. In contradistinction, a conversation lasting 5.9 minutes costs exactly as much as a conversation lasting 3.1 minutes.

However, there has also been proposed recently another method for defining the scale of charges in automatic telephone systems, said method consisting in calculating the charge no longer by means of a series of impulses for every conversation of three minutes, but through the agency of single impulses produced at a predetermined rhythm.

According to the tariff area with which the connection is established, the separate impulses are transmitted at more or less long time intervals so that a much more gradual definition of the charge is obtained than in the case of the first method referred to. This advantage of progressively increasing charges is, however, cut out when associated with a standard paying apparatus as it is necessary to introduce each time money in amounts corresponding to a period of three minutes and consequently, in the case of a conversation lasting say 3.1 minutes, it is necessary to pay as much as for 5.9 minutes. In order to obtain a more gradual progression of the charge, it would be necessary to reduce the unit time from 3 minutes to say 1 minute. This is, however, not practical, as it would be necessary to introduce, at the end of every minute, one or several coins.

The present invention has for its object a prepayment apparatus for automatic telephone systems, wherein the single impulses may be transmitted at varying intervals according to the tariff area to be considered. It permits thus graduating the actual payment in accordance with this kind of charge-reckoning, the graduation being as accurate as allowed by the value of the coins used. The invention is characterized by the fact that there are provided means collecting the coins and refunding any amount of money beyond that corresponding to the charge, so as to allow the introduction, at the beginning of the conversation, of a substantially large sum V, into the apparatus that refunds, at the end of the conversation, the remaining money G constituted by the difference between the amount V introduced and the actually spent amount S owing as a charge for the conversation, rounded up to the nearest amount obtainable with the coins introduced into the apparatus. The following equation remains always true:

$$G=V-S$$

$G$=credit to the caller
$V$=provision constituted by the total introduced,
$S$=amount owing (corresponding to the actual duration of the conversation).

At the end of the conversation, the credit G, as reckoned at this moment, is refunded to the caller.

This requirement is easily fulfilled when the payment apparatus is adapted to receive only one kind of coins. When introducing a provision of say eight ten-cent coins to make up 80 cents, while the charge to be paid for the conversion S is only 45 cents, the amount retured is $G=35$ cents. In this case, there are returned, at the end of the conversation, three 10-cent coins, and the amount G to be returned is rounded up to the nearest amount that may be formed with 10-cent coins; in the case considered, it is rounded up to 30 cents, instead of 35 cents.

In the present case, there are returned $$N_1=\frac{G}{M_1}$$

coins, forming the returned money, $N_1$ being always an integer. In this equation, $N_1$ designates the number of returned coins of a type 1 and $M_1$ the value of the coins of this type 1.

The conditions are more difficult in the case where several types of coins are used. In order to ensure as easy a payment as possible while allowing a return payment G with an accuracy as high as possible, it is proposed, in accordance with the invention, to first pay back as many coins of the larger type 1 as may be comprised in the amount to be refunded and then to refund from the remaining credit $R_1$ as many coins of the second type as may comprised in $R_1$. There remains at the end of this operation an unpaid non-returned money $R_n$ that is smaller than the smallest type of coin $M_n$. This leads to the following equation:

$$R_n=G-\frac{G}{M_1}-\frac{R_1}{M_2}-\frac{R_2}{M_3}-\frac{R_3}{M_4}<M_n$$

By way of exemplification, we will now disclose an operation carried out with three different kinds of coins.

The prepayment provision V comprises four 25-cent coins plus two ten-cent coins plus three 5-cent coins:

Charge owing $S=68$ cents.

Amount to be refunded $G=67$ cents.

There are first returned from the total amount to be paid back $G=67$ cents, as many 25-cent coins as possible, i. e. $2\times25=50$ cents, so that there remains $R_1=17$ cents. From this remainder $R=17$ cents, there is again returned one 10-cent piece with a remainder $R_2=7$ cents; from this latter remainder is again returned a 5-cent coin, so that the final remainder $R_3=R_n=2$ cents, which latter cannot be paid back.

We have illustrated in accompanying drawings a preferred embodiment of our invention.

Figure 1:
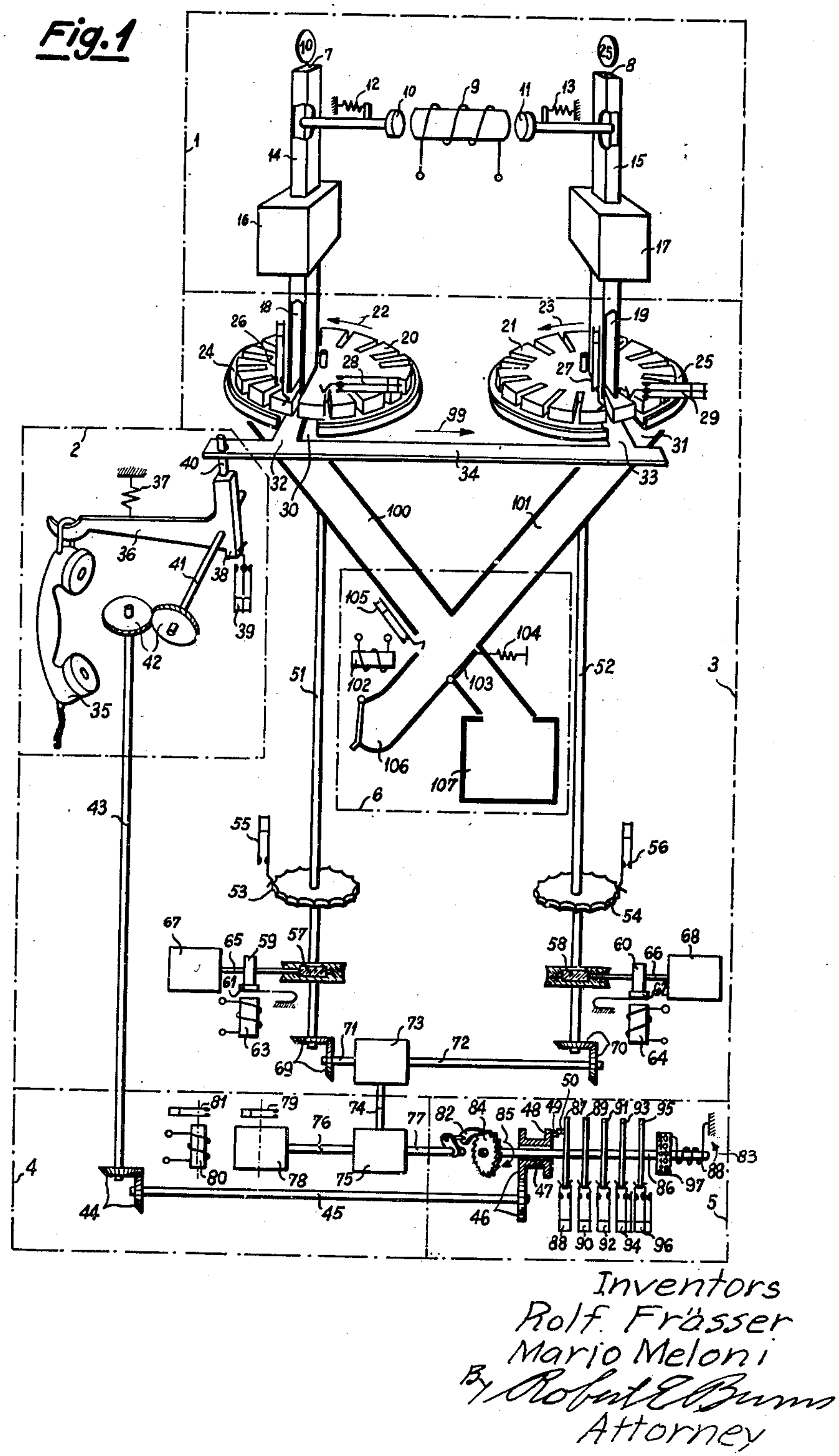
Fig. 1 is a general diagram of the apparatus supposed to be provided for the introduction of 10-cent and 25-cent coins.

The apparatus illustrated includes principally the following six units, to wit: the coin-receiving mechanism 1, the hook-controlled switch with the telephone mouth-piece 2, the money collecting and returning mechanism 3, the mechanism 4 metering the charge-impulses, the indicator 5 recording the amounts owed and to be paid back and the means 6 returning the change and cashing the amounts due.

In the inoperative position of the apparatus, as shown in Fig. 1, the coin introduction slots 7 and 8 are locked, the telephone handset 35 is suspended to its hook and the coin-guiding flap 103 is set in the position illustrated while the indicator 97 of the money to be refunded is at zero.

If it is desired to call up a subscriber, it is necessary to lift the handset from its hook 36 so that the spring 37 may pull the hook 36 upwardly.

Consequently, the rod 40 rigid with the hook urges the lever 34 in the direction of the arrow 99 and the two pusher members 32 and 33 rigid with said lever 34 close the output channels 30 and 31 provided in the corresponding plates 24 and 25 carrying the coin collecting plates 20 and 21 respectively, that are described hereinafter.

The rotation of the spindle 41 forming the pivot of the hook 36 is also transmitted to the control plate 48 through the worm wheels 42, the spindle 43, the bevel pinions 44, the spindle 45, the sprocket wheels 46 and finally the hollow spindle 47 carrying the plate 48. This urges the projection 49 forming on said plate 48 an abutment for the stud 50 rotating in synchronism with the indicator 97, from its zero position into a position corresponding e. g. to a rotation of said indicator 97 showing the money to be returned to a value of say 10 cts. The indicator can therefore, during the conversation, show an amount owing as high 10 cts.

When the handset 35 is raised, the switch system 39 is also controlled by reason of its actuation by the tip 38 of the hook 36. This provides current for the locking relay 9 which draws the bolts 10 and 11 back so as to release the coin introduction slots 7 and 8.

Figure 3:
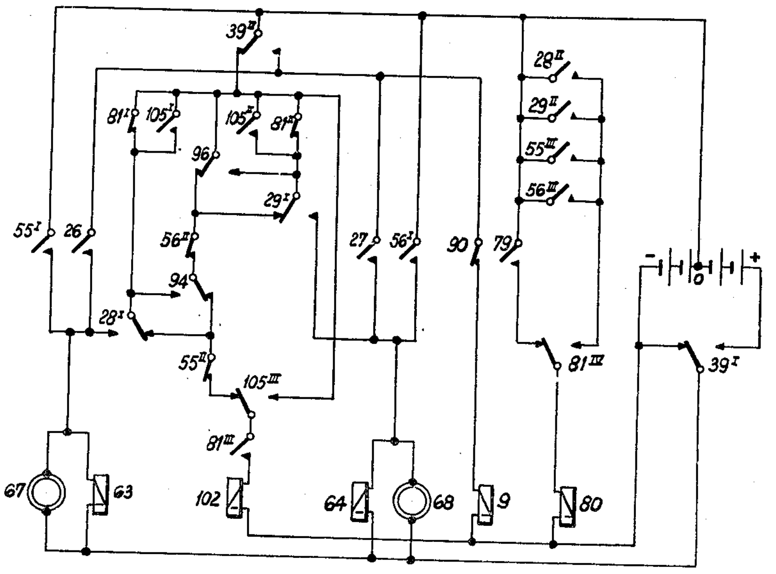
Fig. 3 is a wiring diagram of the connections between the motors, the relay and the switches of the apparatus.

This control of the locking relay 9 is obtained as illustrated in Fig. 3, through the closing of the circuit:

Battery neutral point-operative switch $39^{II}$—swtich 90—locking relay 9 and return to the negative pole of the battery.

The calling operator may then insert his money, e. g. he introduces a coin of 10 cents, which latter drops through the channel 14 (Fig. 1) into the coin-checking device 16, which sorts and rejects in the well-known manner the spurious coins. If the coins are genuine, they drop further through the channel 18 into an underlying radial slit of the coin collecting plate 20 and are held on the pusher member 32 engaging an opening in the underlying plate 24 through which the slot in the plate 20 registers with the chute 100. This allows the coin to engage the switch 26 providing for continuation of the operation through the closing of the following circuit (Fig. 3):

Battery neutral point-operative switch $39^{II}$—switch 26—motor 67 and brake controlling electro-magnet 63—operative switch $39^{I}$—return to the positive pole of the battery.

Consequently, the electro-magnet 63 (Fig. 1) attracts the brake 61 which releases the braking drum 59 and simultaneously the motor 67 begins running. The rotation of the latter is transferred through the spindle 65 and the worm gear 57 to the spindle 51 controlling the coin-collecting plate 20 that begins revolving in the direction of the arrow 22. Thus, the coin is carried round with the collecting plate 20 and the switch 26 opens again. The motor 67 and the braking magnet 63 remain, however, energized as the cam plate 53 revolves with the spindle 51 and closes the switch system 55 before the switch 26 is reopened as described.

The switch 55 closes, therefore, the following branch circuit holding the motor and electro-magnet in their energized conditions, as illustrated in Fig. 3:

Battery neutral point—switch $55^{I}$—motor 67 and brake-operating electro-magnet 63—operative switch $39^{I}$ and return to the positive pole of the battery.

After the cam plate 53 has executed its rotary movement by a predetermined angle, the switch 55 opens again and breaks the above described circuit feeding the motor 67 and the electro-magnet 63. The brake 61 locks immediately the spindle 65 of the motor 67 so that the spindle 51 and the coin-collecting plate 20 remain in the position they are occupying transiently. The 10-cent coin is, therefore, shifted exactly by one subdivision or slit interval of the coin-collecting plate 20 in the direction of the arrow 22 and is held up in the position reached by it. At the same time, there is again an empty slit registering with the lower end of the coin-feeding channel 18 and with the pusher member 32.

The 10-cent coin is now located exactly in register with the lower part of the switch 28 which is thereby operated and this closing of the switch 28 prepares for subsequent energization of the relay 80 and also for subsequent showing, in the case of a possible refund of coins, that at least one 10-cent coin has been actually introduced into the apparatus.

The angular shifting of the spindle 51 by one step is transmitted simultaneously to the refund-money indicator at 97 through the following gears and spindles:

Bevel gears 69—spindle 71—differential gear 73—spindle 74—differential gear 75—spindle 77—pawl 82—ratchet wheel 84 and spindle 86 carrying the indicator 97.

The gear ratios are selected in a manner such that the indicator 97 may rotate starting from zero by an angle giving out directly the value of the coins introduced into the apparatus; in the case illustrated, this angular movement corresponds to 10 cents.

Figure 2:
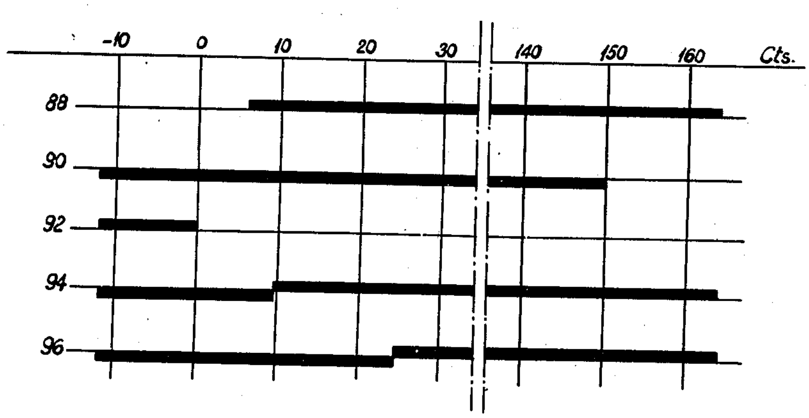
Fig. 2 is a diagram illustrating the operation of the control switches controlled in their turn by the amount owing and by the amount to be returned which are recorded inside the apparatus.

The rotation of the spindle 86 provides also for the rotation of the cam plates 87, 89, 91, 93 and 95 while the switches 88, 90, 92, 94 and 96 controlled thereby assume the position illustrated in Fig. 2 corresponding to a credit value by an amount of 10-cents. The switch 88 is closed and connects the payment apparatus with the subscriber's line. As a matter of fact, the periods of closing of these switches plotted against values of coins introduced into the apparatus are shown in black, the switches 94 and 96 being shifted between two positions of operation.

The introduction of a 25-cent coin is performed in a similar manner i. e. after introduction of such a coin, the coin-collecting plate 21 (Fig. 1) rotates by one subdivision corresponding to the interval between two slits in the plate in the direction of the arrow 23 and the coin held therein controls the switch 29 in a manner similar to the procedure following the introduction of a 10-cent coin. The rotary movement of the collecting plate 21 is transferred through the following gears and spindles to the indicator 97: spindle 52—bevel pinions 70—spindle 72—differential gear 73—spindle 74—differential gear 75—pawl 82—ratchet wheel 84—and spindle 86 as precedingly.

The gear ratios are again selected in a manner such that the rotation of the collecting plate 21 by one slit interval corresponds to the rotation of the indicator 97 by an amount corresponding to a value of 25 cents.

After introduction of any desired amount corresponding to one or more 10 and/or 25-cent coins, it is possible to begin dialling.

Figure 4:
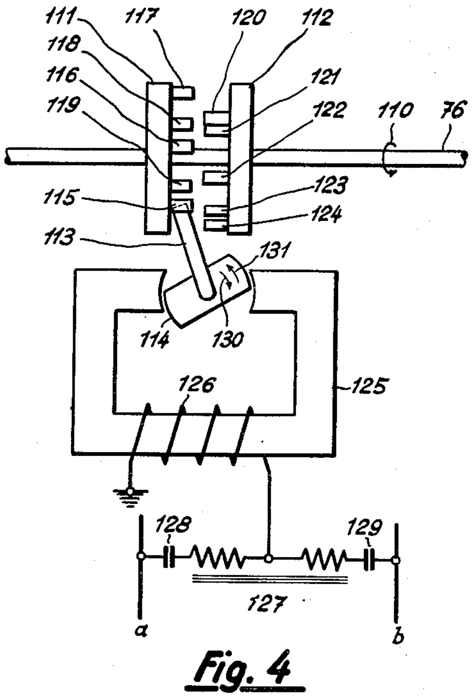
Fig. 4 is a diagrammatic view of a device controlled by the recurrent impulses transmitted by the exchange.
Figure 5:
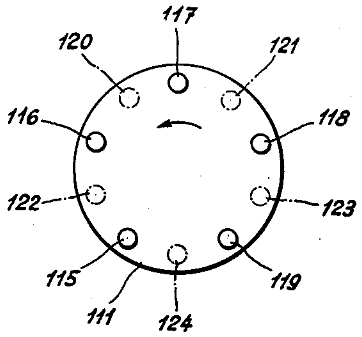
Fig. 5 is a section of a detail through line V—V of Fig. 4.

When the called subscriber has answered, exchange transmits recurrent tax impulses at predetermined time intervals over the subscriber's line; these impulses reach the charge impulse relay 78 which provides for the angular rotation of the spindle 76 by a predetermined angle for each impulse. This partial rotation can be transferred to the indicator 97 in the direction of arrow 83 owing to a helical spring 98 urging the spindle 86 in the said direction 83, whereby the ratchet wheel 84 is urged into a rotary motion against the pawl 82, thus urging the spindle 77 of the differential gear 75 to revolve in a negative direction when spindle 74 is stopped. The differential gear 75 is built up in such a manner that the spindle 76 controlled by the charge impulse relay 78 is submitted to a torque the direction of which is shown by the arrow 110 (Fig. 4), through the action of the spring 98. On the spindle 76 are fastened two discs 111 and 112, each of which carrying five parallel pins at equal angular intervals. The pins 115, 116, 117, 118 and 119 of disc 111 are staggered with respect to the pins 120, 121, 122, 123 and 124 of disc 112 (see Fig. 5) by $\frac{1}{10}$ of a complete revolution. A lever 113 secured to and controlled by the armature 114 is engaged by pin 115 of disc 111 and prevents the spindle 76 from revolving in the direction of arrow 110. The electromagnet 125—126 is fed by the recurrent tax impulses. These impulses are transmitted from the exchange to the prepayment station by means of an energizing circuit comprising a reactance coil 127 provided with a medial tapping 140, and two condensers 128, 128 connected in a known manner to the subscriber's line *a, b*. The winding 126 of the electromagnet 126—127 is connected to the medial tapping 140 and to the ground. At each impulsion, the armature 114 is given an oscillatory movement illustrated by the arrows 130 and 131. When the armature moves in the direction of arrow 130, the lever 113 releases pin 115 and the spindle 76 starts to turn in the direction of arrow 110 until the pin 122 of disc 112 comes into engagement with the lever 113. At the end of the impulsion, the armature 114 is pulled back to its resting position, as shown, by turning in the direction of the arrow 131. The lever 113 releases pin 122 and the spindle 76 revolves again according to the arrow 110 until the pin 116 of the disc 111 is stopped by the lever 113. On this manner, the spindle 76 revolves ⅕ of a revolution for each recurrent impulse. The gear ratio is selected in a manner such that the refund money indicator is turned back for each charge impulse by a corresponding amount of say five cents, said rotation being performed in the direction of the arrow 83. At each input of a charge impulse, the corresponding charge relay 78 closes also its switch 79 whereby the relay 80 is energized through the closing of the following circuit (Fig. 3):

Battery neutral point—closed switch 79—contact piece $81^{IV}$—relay 80—return to the negative pole of the battery.

The relay 80 closes then its switches 81 and the elementary switch $81^{IV}$ ensures now its self-energization through the following circuit:

Battery neutral point—closed switches $28^{II}$ and $29^{II}$—operative switch $81^{IV}$—relay 80—return to the negative pole of the battery.

During conversation, it is possible to introduce further amounts of money as often as may be desired. The cam plate 89 (Fig. 1) cooperates with the switch 90 in a manner such that the locking relay 9 becomes inoperative and allows the coin input slots 7 and 8 to close before the return money indicator 97 and therewith the cam plates 87, 89, 91, 93 and 95 have executed a complete revolution, said revolution corresponding to an amount of of say 150 cents as in the case illustrated in Fig. 2. This closing is only released when, after further charge impulses have entered the apparatus, the spindle 86 (Fig. 1) has been returned sufficiently far for the switch 90 to bring the locking relay 9 back into its operative energized condition.

However if, during the conversation, the amount of money to be refunded has been wiped out by the recurrent charge impulses, this is made apparent to the caller by the fact that the indicator 97 has been brought back to zero and has closed the switch 92 (Fig. 2) and controls a warning device that need not be disclosed with any further detail, as it does not form part of the invention, said device showing the caller that the money he has inserted into the apparatus is used up and that he must now introduce more money. If he does not proceed with such an introduction, the warning device cuts the connection automatically after a predetermined time has elapsed.

When the subscriber hooks his handset back after the end of the conversation and if there is still some credit balance to be refunded, the amount of which is larger than the value of the smallest coin introduced into the apparatus, such a refunding is performed. When two sorts of coins, in the present case 10-cent coins and 25-cent coins, have been introduced, there are first refunded as many 25-cent coins as possible and then the remainder in the form of 10-cent coins.

If, however, only one type of coin has been inserted, only this type of coin can be refunded.

The rocking of the hook and of its spindle 41 produced through the hooking of the handset 35 (Fig. 1) controls through the successive gears 42, 44 and 46, a further rotation of the plate 48 whereby the stop 49 returns the stud 50 into the position corresponding to zero on the indicator 97.

According to the location of the cam plate 93 at the moment of the engagement of the telephone handset 35 on its hook, the position of the switch 94 shows whether the amount to be returned is more or less than 10 cents and similarly, the position of the switch 96 shows whether the said amount is larger or smaller than 25 cents (see Fig. 2). Further, the state of energization of the switch 28 (Fig. 1) shows whether at least one 10-cent coin has been introduced or not, as the last 10-cent coin introduced is shifted by one step after the rotation of the coin-collecting plate 20, so as to come exactly into register with the switch 28 and to control the operation of the latter. Similarly thereto, the switch 29 shows whether a 25-cent coin has been introduced or not.

Supposing the calling party has inserted both 10-cent and 25-cent coins and has to his credit at the end of the conversation 65 cents; then this amount is refunded to him in the following manner: when suspending the handset 35 on its hook, the pusher members 32 and 33 return into their original positions and release the output channels 30 and 31. Further, the tip 38 of the hook 36 releases again the switch system 39 that returns into its inoperative position. This being done, the switch $39^{I}$ (Fig. 3) prepares the circuit for the rotation of the motors 67 and 68 in a direction opposed to that assumed by them precedingly while the switch $39^{II}$ starts the motor 68 through the closing of the following circuit:

Battery neutral point—shifted switch $39^{II}$—operative switch 96— operative switch $29^{I}$—motor 68 and brake-operating electromagnet 64—reversed switch $39^{I}$—and return to the negative pole of the battery.

Consequently, the brake 62 (Fig. 1) is released and allows the motor 68 to start and make the coin-collecting plate 21 rotate in a manner described in a direction opposed to the arrow 23. After a short angular movement, the coin-collecting plate 21 has shifted the 25-cent coin away from its contact with the lower part of the switch 29 so that the latter is allowed to return into its inoperative position. The motor 68 and the brake-controlling electromagnet 64 remain, however, energized as, slightly before this, the cam plate 54 on the spindle 52 which provides the angular shifting of the coin-collecting plate by one complete slot interval, has actuated the switch 56, which latter closes the following circuit (Fig. 3):

Battery neutral point—closed switch $56^{I}$—motor 68 and brake-controlling electromagnet 64—switch $39^{I}$—and return to the negative pole of the battery.

The rotary coin-collecting plate 21 (Fig. 1) transfers the 25-cent coin into register with the output channel 31 into which it drops and reaches through the chute 101 the money-returning cup-shaped member 106.

This return movement of the spindle 52 is transmitted through the bevel wheels 70, the differential gears 73 and 75, the pawl 82 and the ratchet wheel 84 to the spindle 86. At the same time, the cam plates 87 to 95 and the indicator 97 revolve by an angle corresponding to the value of a 25-cent coin. The credit is now reduced by 25 cents to 65—25=40 cents, and now a further 25-cent coin should be refunded.

Although, after rotation of the coin-collecting plate 21 by one subdivision, the switch 56 returns again into its inoperative position and opens the last described circuit, the motor 68 and the brake-controlling electromagnet 64 still remain operative, as in the meantime a coin has again reached the switch 29 and has again provided for its closing. Now, as shown in Fig. 2, the switch 96 remains still energized for a value of 40 cents; the circuit first described for the return of money is closed and the coin-collecting plate 21 (Fig. 1) moving in the return direction provides, as in the case of the first coin, for the return of a second 25-cent coin into the money-returning cup-shaped member 106. Thus, the indicator 97 will enter a position corresponding to 40—25=15 cents. It is, therefore, necessary for the apparatus to refund a 10-cent coin now. In the case of this credit of 15 cents, the switch 96 is still in its inoperative position, as shown in Fig. 2, while the switch 94 is still in its operative position. The switch 96 has thereby prepared the closing of the circuit providing for the refunding of a 10-cent coin.

After the second 25-cent coin has dropped into the cup-shaped member 106 (Fig. 1) through which the money is returned, the spindle 52 continues rotating until the cam plate 54 has returned the switch system 56 into its inoperative position and consequently the coin-collecting plate 21 has finished its angular shifting by a second slit interval.

The actuation of the switch $56^{I}$ (Fig. 3) that assumes its inoperative position, breaks the energizing circuit for the motor 68 and the brake-controlling electromagnet 64, whereby the motor 68 is braked and brought to a standstill. In contradistinction, the switch $56^{II}$ starts the motor 67 through closing of the following circuit:

Battery neutral point—closed switch $39^{II}$— switch 96—switch $56^{II}$—operative switch 94—operative switch $28^{I}$—motor 67 and brake-controlling electromagnet 63—switch $39^{I}$—return to the negative pole of the battery.

In a manner similar to the return of the 25-cent coins, the coin-collecting plate 20 begins revolving in the direction opposed to the arrow 22 (Fig. 1). As soon the the 10-cent coin held underneath the switch 28 has moved away from the latter, said switch opens and breaks the above described circuit at $28^{I}$. The motor 67 and the electromagnet 63 remain, however, energized as in the meantime, the cam plate 53 on the spindle 51 has actuated the switch system 55 so that the following circuit is closed, as shown in Fig. 3:

Battery neutral point—switch $55^{I}$—motor 67 and brake-energizing electromagnet 63—switch $39^{I}$—and return to the negative pole of the battery.

The coin-collecting plate 20 (Fig. 1) continues therefore revolving so that the 10-cent coin comes nearer the outlet slot 30 underneath said plate 20 and, consequently, the coin drops into the chute 100 and slides over the flap 103 into the money-returning member 106.

The rotary movement of the spindle 51 is simultaneously transmitted, through the bevel wheels 69, the differential gears 73 and 75, the pawl 82 and the ratchet wheel 84, to the spindle 86. This constrains the refund indicator 97 to revolve by an angle corresponding to 15—10=5 cents without, however, providing any further refunding of money and, in contradistinction, the money carried by the two money-collecting plates, 20 and 21, should be cashed. Consequently, after the 10-cent coin has dropped into the cup-shaped member 106 through which money is returned to the calling party, the spindle 51 revolves still further, until the cam plate 53 has opened the switches 55 and the coin-collecting plate 20 has thus finished its revolution by one slit interval.

As apparent from inspection of Fig. 2, the switch 94 is brought back into its inoperative position for this credit of 5 cents and it prepares the circuit for the cashing of the coins remaining on the plates 20 and 21. When the elementary switch $55^{I}$ has returned into its inoperative position, it breaks the energizing circuit of the motor 67 and of the brake-controlling electromagnet 63, so that the motor 67 is braked and brought to a standstill. The switch $55^{II}$ provides, in contradistinction, for the energization of the electromagnet 102 through the following circuit:

Battery neutral point—switch $39^{II}$—switch 96—switch $56^{II}$—switch 94—switch $55^{II}$—switch $105^{III}$—closed switch $81^{III}$—electromagnet 102—and return to the negative pole of the battery.

The energization of the electromagnet 102 (Fig. 1) shifts the flap 103 into the position closing the return of coins towards 106 and opening the coin-collecting box 107. At the same time, the electromagnet 102 operates the switch system 105. Thus, the motors 67 and 68 are energized again through the circuits constituted as follows (Fig. 3):

Battery neutral point—switch $39^{II}$—closed switch $105^{I}$—operative switch $28^{I}$—motor 67 and brake-controlling electromagnet 63—switch $39^{I}$—and return to the negative pole of the battery, the other circuit being as follows:

Battery neutral point—switch $39^{II}$—closed switch $105^{II}$—operative switch $29^{I}$—motor 68 and brake-controlling electromagnet 64—switch $39^{I}$—return to the negative pole of the battery.

On the other hand, the electromagnet 102 remains self-energized through the following circuit:

Battery neutral point—switch $39^{II}$—operative switch $105^{III}$—closed switch $81^{III}$—electromagnet 102—and return to the negative pole of the battery.

The motors 67 and 68 (Fig. 1) drive their coin-collecting plates 20 and 21 rearwardly in the direction opposed to the arrows 22 and 23, whereby the remaining coins drop in succession through the output openings 30 and 31 registering with the input slits in the plates, into the chutes 100 and 101, whereby they slide over the shifted flap 103 into the money-collecting box 107. The total of the money thus cashed corresponds to the conversation charge plus the credit of 5 cents that is not paid back in the example disclosed.

During the return movement just described of the coin-collecting plates 20 and 21, the alternating operation of the switches 28 and 55 on one hand and of the switches 29 and 56 on the other hand is repeated, and each time a coin is removed out of engagement with the switch 28 or 29, as the case may be, so as to break the corresponding circuit, the cam plate 53 or 54 has already closed the associated switch 54 or 56 and holds thus the corresponding motor 67 or 68 in its energized position.

After the last 10-cent coin has thus been collected, the motor 67 continues rotating only until the switch 55 opens its energizing circuit. As there are now no more 10-cent coins in the coin-collecting plate 20, the switch 28 remains inoperative. The motor 67 receives no current through said switch and comes to a standstill under the braking effect executed by the brake 61.

The conditions of stopping are the same for the motor 68, as soon as the last 25-cent coin has been cashed. The rearward angular movements of the coin-collecting plates 20 and 21 are transferred, in the manner already disclosed, to the cam plates 87—95 and to the indicator 97. These cam plates and indicators accompany this return movement until the stud 50 on the plate 87 is brought to engage the stop 49 on the plate 48, which occurs when the indicator has returned to zero. As, however, the coin-collecting plates 20 and 21 continue moving rearwardly, the pawl 82 slides over the cooperating ratchet wheel while the indicator 97 remains in its zero position.

During the cashing of the coins, the relay 80 (Fig. 3) is alternatingly held energized through the switches $28^{II}$ and $55^{III}$ or $29^{II}$ and $56^{III}$ in the same manner as disclosed with reference to the energization of the motors.

As soon as the last coin has been cashed by the apparatus, the switches $28^{II}$ and $29^{II}$ remain open and when, the rotation being at an end, the switches $55^{III}$ and $56^{III}$ also open, the relay 80 is de-energized. Consequently, the switch $81^{III}$ controlled thereby opens and breaks the energizing circuit of the electromagnet 102.

Upon de-energization of the electromagnet 102, the flap 103 returns into the position illustrated under the action of the spring 104 so that the whole apparatus returns into its inoperative position.

The above described embodiment shows the manner of refunding two 25-cent coins and one 10-cent coin. It may also occur, however, that the calling party has introduced one 25-cent coin only, or even none at all. Considering this latter case and supposing there is again a credit of 65 cents to be paid back to the calling party, the switches 94 and 96 are both operative for this amount of 65 cents, as per Fig. 2. Now, as there have been introduced only 10-cent coins, the switch 28 is operative while the switch 29 is inoperative. When the telephone handset 35 is hung up on its hook at the end of the conversation, this closes the following circuit to be found in Fig. 3:

Battery neutral point—switch $39^{II}$—operative switch 96—switch $29^{I}$—switch $56^{II}$—operative switch 94—operative switch $28^{I}$—motor 67 and brake-controlling electromagnet 63—switch $39^{I}$—and return to the negative pole of the battery.

Consequently, the motor 67 is directly caused to start in order to return the 10-cent coins, and said return of coins continues in the manner already described.

In a modification wherein only 25-cent coins have been introduced into the apparatus, the difference with reference to the first example consists in the fact that after return of the second 25-cent coin, the cashing of the remainder is executed directly without any energizing of the motor on the 10-cent coin side. As readily apparent from the diagram in Fig. 3, the switch $28^{I}$, now inoperative, is responsible for this opening of the corresponding energizing circuit and thereby the electromagnet 102 is energized immediately when the switch 96 has been shifted after the money has been refunded into its rest position and the switch 56 has closed its circuit.

The same occurs when both types of coins have been introduced and, after refunding of the 25-cent coins, the remaining credit is less than 10 cents, as the switch 94 is then inoperative, so that the electromagnet 102 is energized again after the closing of the switch $56^{II}$.

However if, at the end of the conversation, there is still a charge to be paid by the calling party, no money should be refunded at all. The switches 94 and 96 are then both in their rest positions, as apparent from inspection of Fig. 2, while the switches $28^{I}$ and $29^{I}$ are operative. Consequently, if the handset 35 of the telephone is replaced onto its hook and the switches $39^{I}$ and $39^{II}$ are actuated, the electromagnet 102 is immediately energized to operate the cashing of the coins through the following circuit:

Battery neutral point—switch $39^{II}$—switch 96—switch $56^{II}$—switch 94—switch $55^{II}$—switch $105^{III}$—closed switch $81^{III}$—electromagnet 102—and return to the negative pole of the battery.

The cashing of the coins is executed in the manner described with reference to the first example.

It often occurs that a conversation on the telephone cannot be obtained either because the called person is not present or because the subscriber's line is busy.

In such a case, no charge impulse is sent by the exchange and the relay cannot become operative.

Now, if the telephone handset is hung up onto its hook by the calling party, the two motors run simultaneously over the following circuits respectively:

Battery neutral point—switch $39^{II}$—switch $81^{I}$—operative switch $28^{I}$—motor 67 and brake-controlling electromagnet 63—switch $39^{I}$ and return to the negative pole of battery, and:

Battery neutral point—switch $39^{II}$—switch $81^{II}$—switch $29^{I}$—motor 68 and brake controlling electromagnet 64—switch $39^{I}$ and return to the negative pole of the battery.

The motors 67 and 68 rotate thereby in their reversed direction until no coin is to be found any more in the coin-collecting plates 20 and 21 and consequently the switches $28^{I}$ and $29^{I}$ are inoperative so that the above described motor-feeding circuits are broken and the apparatus returns into inoperativeness. Thus, the coins introduced by the calling party into the apparatus have been refunded to him.

With the improved method disclosed at the beginning of the specification and concerning the manner of defining the charges through the periodical transmission of recurrent impulses, it may be desired to require for the actual obtention of the connection a standard fee. This may be obtained very simply through an angular shifting of the cam plates 87 to 95 by a corresponding amount with reference to the zero position. The indicator 97 and the stud 50 should however remain in zero position.

A modification of the charge to be paid for each charge impulse is also obtainable through a corresponding modification of the ratio of the transmission gear between the impulse relay 76 and the differential gear 75.

What we claim is:

1. In a prepayment station for automatic telephone systems of the character described in which the exchange office is adapted to transmit recurrent tax impulses over the subscriber's line as soon as a connection with the called party has been achieved, a pivotal hook, a telephone handset carried thereby, a plurality of coin-collecting members adapted to receive each a large number of coins of uniform face value, a motor associated with each coin-collecting member and adapted each time a coin is introduced into the corresponding coin-collecting member to revolve by a predetermined angle, a device fed by the incoming tax impulses the rhythm of which depends on the area with which communication has been established, an indicator submitted to the action in opposite directions of the angular movements of the different motors, on one hand, and of the impulse-operated device on the other hand, said indicator showing at every moment the difference between said angular movements corresponding to the difference between the total amount of coins paid into the coin-collecting members and the charge owing defined by said incoming impulses, a collecting box, a coin-refunding channel, means controlled by hanging the telephone handset onto its hook for allowing the successive dropping into said channel of the coins carried by the different coin-collecting members, chutes feeding coins from the coin-collecting members into the collecting box and the coin-refunding channel, a guiding member assuming two positions adapted to deflect the coins from said chutes respectively into the collecting box and into the coin-refunding channel, means whereby the indicator stops the refunding of the money from the different coin-collecting members as soon as the indication on the indicator has dropped underneath corresponding predetermined values and thereafter shifts said guiding member from the second position into the first position and provides for the dropping of the remaining coins from all the coin-collecting members through the chute into the collecting box.

2. In a prepayment station for automatic telephone systems of the character described in which the exchange is adapted to transmit recurrent tax impulses over the subscriber's line as soon as a connection with the called party has been achieved, a plurality of coin-collecting members adapted to receive each a large number of coins of uniform face value, a motor associated with each coin-collecting member to revolve each time a coin is introduced into the corresponding coin-collecting member by a predetermined angle, a device fed by the said recurrent tax impulses and adapted to revolve by an angle proportional to the number of impulses, a differential system forming the difference between the sum of values proportional to the angular rotations of the motor on one hand and the angle travelled over by the impulse-operated device on the other hand, an indicator controlled by said differential system to show at every moment the difference between the total of coins paid into the coin-collecting members and the total charge defined by the said recurrent tax impulses, means whereby, at the end of the conversation, the coins in the different coin-collecting members are refunded to the operator and means controlled by the return of the indicator through a predetermined value to stop said refunding of money, and a collecting box adapted to cash the remaining coins after the coin refunding operation is at an end.

3. In a prepayment station for automatic telephone systems of the character described in which the exchange is adapted to transmit recurrent tax impulses over the subscriber's line as soon as a connection with the called party has been achieved, a plurality of coin-collecting members adapted to receive each a large number of coins of uniform face value, a motor associated with each coin-collecting member and adapted, each time a coin is introduced into the corresponding coin-collecting member, to revolve by a predetermined angle, a device fed by said recurrent tax impulses and adapted to revolve by an angle proportional to the number of impulses, a differential system forming the difference between the sum of the angular rotations of the motors on one hand and the angle travelled over by the impulse-operated device on the other hand, an indicator controlled by said differential system to show at every moment the difference between the total money paid into the coin-collecting members and the total charge defined by the said recurrent tax impulses, means whereby, at the end of the conversation, the coins in the different coin-collecting members are refunded to the operator and means controlled by the return of the indicator through a value corresponding to the value of the coins introduced into each coin-collecting member to stop the coin refunding from said member and a collecting box adapted to receive the coins remaining in the coin-collecting members after this coin refunding operation is at an end.

4. In a prepayment station for automatic telephone systems of the character described in which which the exchange is adapted to transmit recurrent tax impulses over the subscriber's line as soon as a connection with the called party has been achieved, a plurality of coin-collecting members adapted to receive each a large number of coins of uniform face value, a motor associated with each coin-collecting member to revolve by a predetermined angle, each time a coin is introduced inside said member, a device fed by the said recurrent tax impulses and adapted to revolve by an angle proportional to the number of impulses, a differential system forming the difference between the sum of the angular rotations of the motor, on one hand, and the angle travelled over by the impulse-operated device, on the other hand, an indicator controlled by said differential system to show at every moment the difference between the total of coins paid into the coin-collecting members and the total charge defined by the said recurrent tax impulses, means whereby, at the end of the conversation, the coins having the highest face value are refunded to the operator, means controlled by the return of the indicator through a value corresponding to said highest face value and adapted to stop said refund of coins to the operator and to cause the refund to the operator of the coins of the next highest face value from the corresponding coin-collecting member, means controlled by the return of the indicator through said next highest face value and adapted to stop said refund of coins of next highest face value and to continue this refund of coins from the following coin-collecting members in the decreasing order of their face values, each refund being stopped by the passing of the indicator through the corresponding face value, means controlled by the return of the indicator through a value corresponding to the lowest face value and adapted to stop the coin refunding from the corresponding coin-collecting member and a collecting box adapted to receive the remaining coins from all the coin-collecting members after this stopping of the refunding to the operator of said lowest face value coins.

5. In a prepayment station for automatic telephone systems of the character described in which the exchange is adapted to transmit recurrent tax impulses since the beginning of the conversation, a plurality of rotary coin-collecting members provided with a large number of radial slits adapted to receive corresponding coins of a uniform face value for each coin-collecting member, means feeding a slit assuming a predetermined angular position in space in the corresponding coin-collecting member, means whereby the introduction of a coin into each coin-collecting member produces an angular movement thereof proportional to the angular distance between successive slits, means transforming said angular movements into movements proportional to the face values of the corresponding coins, means submitted to said recurrent tax impulses defining the charge owing and revolving by an angle proportional to said recurrent impulses, an indicator submitted to the antagonistic action of last two mentioned means, said indicator showing at every moment the difference between the total of coins paid into the different coin collecting members and the charge owing defined by the said recurrent impulses.

6. In a prepayment station for automatic telephone systems of the character described in which the exchange is adapted to transmit recurrent tax impulses over the subscriber's line as soon as a connection with the called party has been achieved, a plurality of coin-collecting members provided with a large number of radial slits adapted to receive corresponding coins of a uniform face value that is uniform for each coin-collecting member, a stationary plate carrying each a coin-collecting member and provided with a radial opening, means adapted to feed a coin into the slit registering with said opening in each coin-collecting member, an electric motor associated with each coin-collecting member, means whereby the dropping of a coin through the coin-feeding means into the corresponding coin-collecting member produces the energization of said motor, means whereby the energization of each motor produces an angular movement of the corresponding coin-collecting member by an amount corresponding to the interval between two slits thereon, an indicator submitted to the action of said recurrent tax impulses defining the charge owing, means whereby the different motors act in a direction opposed to that exerted by the said recurrent impulses to shift said indicator back by amounts proportional to the face values of the corresponding coins each time a coin enters a coin-collecting member slit registering with the opening in the underlying plate, said indicator showing consequently at every moment the difference between the total amount of coins paid into the different coin-collecting members and the charge owing, means whereby the openings in the different stationary plates are closed during conversation and are uncovered after conversation and means whereby the indicator controls, when the conversation is at an end the refunding to the operator of the unspent coins carried by the coin-collecting member and the cashing of the remaining coins.

7. In a prepayment station for automatic telephone systems of the character described in which the exchange is adapted to transmit recurrent tax impulses over the subscriber's line as soon as a connection with the called party has been achieved, a plurality of coin-collecting members provided with a large number of radial slits adapted to receive corresponding coins of a face value, uniform for each coin-collecting member, a stationary plate carrying each a coin-collecting member and provided with a radial opening, means adapted to feed a coin into the slit registering with said opening in each coin-collecting member, an electric motor associated with each coin-collecting member, means whereby the dropping of a coin through the coin-feeding means into the corresponding coin-collecting member produces the energization of said motor, means whereby the energization of each motor produces an angular movement of the corresponding coin-collecting member by an amount corresponding to the interval between two slits thereon, an indicator submitted to the action of said recurrent tax impulses defining the charge owing, means whereby the different motors act in a direction opposed to that exerted by the said recurrent impulses to shift said indicator back by amounts proportional to the face values of the corresponding coin each time a coin enters a coin-collecting member slit registering with the opening in the underlying plate, said indicator showing consequently at every moment the difference between the total of coins paid into the different coin collecting members and the charge owing, a telephone hook adapted to pivot round a stationary axis, pusher members engaging the openings round said stationary plate during conversation and adapted to recede and to uncover said openings upon hanging up of the hook at the end of the conversation, a channel fed by each opening to collect the coin passing through the slit registering with the uncovered opening, means whereby the motors controlling the different rotary members are energized in the direction opposed to that produced previously upon taking down of the hook to make the different coin-carrying slits in the corresponding rotary member register in succession with the opening in the stationary plate and drop the coins into the channel, means controlled by the passage of the indicator submitted to the rearward action of the motors, through values corresponding to the successive face values of the coins in the coin-collecting members associated with the successively energized motors, to close the channels fed thereby, a collecting box adapted to be connected with said channels upon closing of the latter and means controlled by the indicator when it drops through the lowest coin face value and adapted to provide for the transfer of the coins remaining in the collecting members into said collecting box.

8. In a prepayment station for automatic telephone systems of the character described in which the exchange is adapted to transmit recurrent tax impulses since the beginning of the conversation, a plurality of rotary coin-collecting members provided with a number of radial slits adapted to receive corresponding coins of a uniform face value for each coin-collecting member, means for feeding a slit in each coin-collecting member assuming a predetermined location in space with coins of corresponding face value, an electric motor controlling each coin-collecting member, a circuit energizing said motor, a switch in said circuit closed by the engagement of a coin in the slit registering with the coin-feeding means to produce the starting of the motor in a predetermined direction as soon as said coin has entered the slit, a further switch inserted in parallel with the first switch and adapted to energize said circuit before the coin has passed out of reach of the first switch upon rotation of the motor to maintain the energization of the motor until the next slit has come into register with the coin-feeding means, an indicator submitted to the action of said recurrent tax impulses defining the charge owing, means whereby the angular shifting of each motor by an angle corresponding to the interval between two slits shifts said indicator back by an amount proportional to the face value of the corresponding coin, said indicator showing at every moment the difference between the total amount of coins paid into the different coin-collecting members and the charge owing, and means whereby, at the end of the conversation, the coins in the slits of the different coin-collecting members are refunded in succession, slit after slit and member after member, in the order of decreasing face values until the indicator passes for each member in succession through a position corresponding to the face value of said member, and means for collecting the remaining coins.

9. In a prepayment station for automatic telephone systems of the character described in which the exchange is adapted to transmit recurrent tax impulses since the beginning of the conversation, a plurality of coin-collecting members adapted to receive each a large number of coins of uniform face value, a motor associated with each coin-collecting member to revolve by a predetermined angle for each coin introduction, a device fed by the said recurrent tax impulses and adapted to revolve by an angle proportional to the number of impulses, a differential system forming the difference between the sum of values proportional to the angular rotations of the motor, on one hand, and the angle rotated by the impulse-operated device, on the other hand, an indicator controlled by said differential system to show at every moment the difference between the total of coins paid into the coin-collecting members and the total charge defined by the said recurrent tax impulses, a spring acting on the differential system adapted to cut out the clearances therein and to further the operation of the impulse-operated device, means whereby, at the end of the conversation, the coins in the different coin-collecting members are refunded to the operator and means controlled by the return of the indicator through a predetermined value to stop said refund of coins, and a collecting box adapted to receive the remaining coins after the coin refunding operation is at an end.

10. In a prepayment station for automatic telephone systems of the character described in which the exchange is adapted to transmit recurrent tax impulses since the beginning of the conversation, a plurality of rotary coin-collecting members provided each with a number of recesses adapted to receive each a coin of a corresponding face value, a channel adapted to feed coins into the recess of the corresponding coin-collecting member that registers with said channel, an electric motor operatively connected with each rotary coin-collecting member, a cam controlled by said motor, a supply of energy, circuit means adapted to connect each motor selectively for forward and for rearward operation with said supply, means controlled by the beginning and by the end of a telephone connection to prepare the circuit means respectively for forward and return operation of the motors, two switches arranged in parallel in the portion of the circuit means providing for forward operation of each motor and controlled respectively by the presence of a coin in the recess registering with the feed channel and by the cam, said cam being adapted to hold the forward circuit means closed upon starting of the motor until the next recess reached in the forward direction of progression registers with the feed channel, a switch controlled by the coin in the recess preceding that registering with the feed channel during return movement and adapted to energize the corresponding motor in the return direction, differential means controlled positively and in parallel by the different motors, a relay controlled by said recurrent charge impulses and controlling the differential in a direction opposed to that provided by the forwardly operating motors, an indicator controlled by the differential and showing at every moment the difference between the total amount of coin values introduced into the recesses of the different coin-collecting members and the total charge defined by the said recurrent impulses, means whereby the energization of each circuit portion providing for the return of a motor, opens the corresponding circuits of the succeeding motors, means whereby the successive return movements of the different motors after the connection is at an end provides for the refund of the coins to the operator from the corresponding coin-collecting member recesses in the succession of the order of decreasing values, means whereby the passage of the indicator through values corresponding to the face values of the coins in the different members stops the return movement of the corresponding motors and means for collecting the coins remaining in the different members after the rotations of the corresponding motors have been stopped through the passage of the indicator through the corresponding face values.

11. In a prepayment station for automatic telephone systems of the character described in which the exchange is adapted to transmit recurrent tax impulses since the beginning of the conversation, a plurality of rotary coin-collecting members provided each with a number of recesses adapted to receive each a coin of a corresponding face value, a channel adapted to feed coins into the recess of the corresponding coin-collecting member that registers with said channel, an electric motor operatively connected with each rotary coin-collecting member, a cam controlled by said motor, a supply of energy, circuit means adapted to connect each motor selectively for forward and for rearward operation with said supply, means controlled by the beginning and by the end of a telephone conversation to prepare the circuit means respectively for forward and return operation of the motors, two switches arranged in parallel in different portions of the circuit, means for providing for forward operation of each motor and controlled respectively by the presence of a coin in the recess registering with the feed channel and by the cam, said cam being adapted to hold the forward circuit means closed upon starting of the motor until the next recess reached in the forward direction of progression registers with the feed channel, a switch controlled by the coin in the recess preceding that registering with the feed channel during return movement and adapted to energize the corresponding motor in the return direction, differential means controlled positively and in parallel by the different motors, transmission gears inserted between the motors and the differential means and the ratio of which is proportional to the face values of the corresponding coins, a relay controlled by said recurrent charge impulses and controlling the differential in a direction opposed to that provided by the forwardly operating motors, an indicator controlled by the differential and showing at every moment the difference between the total amount of coin values introduced into the recesses of the different coin-collecting members and the total charge defined by the said recurrent impulses, means whereby the energization of each circuit portion providing for the return of a motor, opens the corresponding circuit of the succeeding motors, a coin collecting box, money returning means, a chute operatively connected with the recess registering in each rotary member with the coin-feeding means, guiding means adapted to connect the different chutes selectively with the collecting box and with the coin refunding means, an electromagnet controlling said guiding means, means whereby the successive return movements of the different motors after the connection is at an end provides for the return of the coins to the coin refunding means through the chutes from the corresponding coin-collecting member recesses in the succession of the order of decreasing values, means whereby the passage of the indicator through values corresponding to the face values of the coins in the different members stops the return movement of the corresponding motors and means whereby the passage of the indicator through the last face value energizes the electromagnet and starts the rotation of the different motors to complete their return movement and to empty the coins remaining in the recesses through the chute into the collecting box.

12. In a prepayment station for automatic telephone systems of the character described in which the exchange is adapted to transmit recurrent tax impulses since the beginning of the conversation, a telephone hook shifted into opposed positions by the calling and the end of the call, a plurality of rotary coin-collecting plates provided with equidistant radial slits, channels adapted to feed coins of different face values to a slit in the corresponding coin-collecting plate, a pusher member adapted to engage the underside of the slit registering with each coin-feeding channel and urged out of its slit-closing position through the shifting of the hook at the end of a telephone connection, means closing permanently the other slits in the rotary plate, a motor actuating each rotary plate, a double circuit energizing each motor respectively for forward and rearward operation, a switch inserted in the forward circuit and closed by the coin in the slit registering with the feed channel corresponding thereto, an auxiliary switch holding the forward circuit closed to complete the rotation of the corresponding motor by one interval between two slits of the plate, a switch in the return circuit of each motor controlled by the coin in the slit preceding the slit registering with the feed channel upon return movement, an impulse meter for the said recurrent tax impulses, a gear controlled by each motor and the ratio of which is proportional to the face value of the corresponding coin, an indicator controlled differentially by the rotations of the different gears, on one hand, and the impulse meter, on the other, to show at every moment the difference between the amount corresponding to the coins inserted in the different plates and the charge corresponding to the said recurrent impulses, means controlled by the hook for completing the forward or rearward motor energizing circuits respectively when the connection is on and off, cams controlled by the indicator and adapted, when the indicator returns rearwardly through the values corresponding to the face values of the different coins, to open the return circuits of the corresponding motors, coin-refunding means adapted to collect the coins dropping out of the slits upon return movement of the motors and plates in succession and means for resuming the return movements of the motors and plates and collecting the remaining coins after opening of the different last-mentioned cam-controlled switches.

13. In a prepayment station as claimed in claim 12, the provision of means controlled by the shifting of the hook and including a stop for the indicator upon its return movement, said stop being shifted aside by an angle corresponding to the face value of one coin during the actual connection.

References Cited in the file of this patent

UNITED STATES PATENTS

| Number | Name | Date |
|---|---|---|
| 1,626,807 | Gardner | May 3, 1927 |
| 2,000,804 | Wehren | May 7, 1935 |
| 2,082,561 | Appelius | June 1, 1937 |
| 2,224,702 | Seidel | Dec. 10, 1940 |

FOREIGN PATENTS

| Number | Country | Date |
|---|---|---|
| 699,090 | Germany | Nov. 22, 1940 |
| 699,091 | Germany | Nov. 22, 1940 |